United States Patent
Bloch et al.

(10) Patent No.: US 8,867,356 B2
(45) Date of Patent: Oct. 21, 2014

(54) CREDIT-BASED FLOW CONTROL FOR ETHERNET

(75) Inventors: Gil Bloch, Zichron Yaakov (IL); Diego Crupnicoff, Buenos Aires (AR); Ran Ravid, Tel Aviv (IL); Michael Kagan, Zichron Yaakov (IL); Ido Bukspan, Herzliya (IL)

(73) Assignee: Mellanox Technologies Ltd., Yokneam (IL)

( * ) Notice: Subject to any disclaimer, the term of this patent is extended or adjusted under 35 U.S.C. 154(b) by 148 days.

(21) Appl. No.: 13/245,886

(22) Filed: Sep. 27, 2011

(65) Prior Publication Data

US 2013/0077489 A1    Mar. 28, 2013

(51) Int. Cl.
H04L 12/801 (2013.01)
H04L 12/851 (2013.01)
H04L 12/825 (2013.01)

(52) U.S. Cl.
CPC ............. *H04L 47/39* (2013.01); *H04L 47/24* (2013.01); *H04L 47/26* (2013.01)
USPC ........................................................ 370/235

(58) Field of Classification Search
CPC .................................................... H04L 47/39
See application file for complete search history.

(56) References Cited

U.S. PATENT DOCUMENTS

| 2003/0026267 A1* | 2/2003 | Oberman et al. | 370/397 |
| 2008/0232251 A1* | 9/2008 | Hirayama et al. | 370/235 |

OTHER PUBLICATIONS

Infiniband Trade Association, "Infiniband Architecture Specification", vol. 1, release 1.2.1, Nov. 2007.

IEEE, 802.3 "Standard for Information technology—Telecommunications and information exchange between systems—Local and metropolitan area networks—Specific requirements" Part 3: Carrier Sense Multiple Access with Collision Detection (CSMA/CD) Access Method and Physical Layer Specifications Corrigendum 1: Timing Considerations for Pause Operation, David J. Law et al, Jan. 2009.

Desanti, C., "802.1Qbb—IEEE Standard for Local and Metropolitan Area Networks—Virtual Bridged Local Area Networks—Amendment: Priority-based Flow Control", Sep. 14, 2008.

* cited by examiner

*Primary Examiner* — Huy D Vu
*Assistant Examiner* — Bao G Nguyen
(74) *Attorney, Agent, or Firm* — D. Kligler I.P. Services Ltd.

(57) ABSTRACT

A method for communication includes sending a pause frame from a first node to a second node over a communication link between the nodes. In response to the pause frame, one or more data frames are immediately transmitted from the second node to the first node upon receipt of the pause frame at the second node.

14 Claims, 2 Drawing Sheets

CREDIT-BASED FLOW CONTROL FOR ETHERNET

FIELD OF THE INVENTION

The present invention relates generally to computer networks, and particularly to methods and apparatus for controlling packet flow over network links.

BACKGROUND

Ethernet is a family of computer network standards that are widely used in wired local area networks (LANs). These standards have been codified by the IEEE 802.3 working group and define a wide range of link-level protocol features and medium access control (MAC) functions. The term "link" is used in the context of the present description and in the claims in its conventional sense to mean a direct physical connection between a pair of network nodes.

For full-duplex links, Annex 31B of the IEEE 802.3 specification defines an optional flow control operation using "PAUSE" frames. When the receiver on a given link transmits a PAUSE frame to the transmitter, it causes the transmitter to temporarily stop all transmission on the link (except certain control frames) for a period of time that is specified in the PAUSE frame. This pause mechanism enables the receiver to recover from states of congestion.

Recently, a number of new IEEE standards for data center bridging (DCB) have been proposed, offering enhanced Ethernet flow control capabilities. For example, the IEEE 802.1Qbb project authorization request (PAR) provides priority-based flow control (PFC) as an enhancement to the pause mechanism described above. PFC creates eight separate virtual links on a given physical link and allows the receiver to pause and restart the virtual links independently. PFC thus allows the operator to implement differentiated quality of service (QoS) policies for the eight virtual links.

SUMMARY

Embodiments of the present invention that are described hereinbelow provide enhanced methods and mechanisms for network flow control.

There is therefore provided, in accordance with an embodiment of the present invention, a method for communication, which includes sending a pause frame from a first node to a second node over a communication link between the nodes. In response to the pause frame, one or more data frames are immediately transmitted from the second node to the first node upon receipt of the pause frame at the second node.

In some embodiments, the pause frame includes a field containing a value indicating that the pause frame is a medium access control (MAC) control frame in accordance with a network standard applicable to the communication link. The network standard may be an Ethernet standard. The field may be selected from a group of fields consisting of a destination address field containing a multicast address reserved for pause frames, a type field containing a control frame type code, and an operation code field containing a pause opcode.

In disclosed embodiments, sending the pause frame includes indicating in the pause frame a flow control credit limit allocated by the first node to the second node, and transmitting the one or more data frames includes transmitting a volume of data from the second node to the first node in accordance with the credit limit. In one embodiment, indicating the flow control credit limit includes indicating in the pause frame respective credit limits for a plurality of priority groups on the communication link, and transmitting the volume of data includes controlling transmission of the data from the second node to the first node in each of the priority groups in accordance with the respective credit limits.

There is also provided, in accordance with an embodiment of the present invention, a communication system, including first and second network nodes connected by a communication link. The first network node is configured to send a pause frame over the communication link to the second network node. The second network node is configured to transmit, in response to the pause frame, one or more data frames over the communication link to the first network node immediately upon receipt of the pause frame at the second network node.

There is additionally provided, in accordance with an embodiment of the present invention, communication apparatus, including a communication port, which is configured to be coupled to a communication link for communication with a network node. Logic is configured to send a pause frame via the communication link to the network node so as to cause the network node, in response to the pause frame, to transmit one or more data frames over the link to the communication port immediately upon receipt of the pause frame at the network node.

There is further provided, in accordance with an embodiment of the present invention, communication apparatus, including a communication port, which is configured to be coupled to a communication link for communication with a network node. Logic is configured to receive a pause frame via the communication link from the network, and in response to the pause frame, to transmit one or more data frames over the link via the communication port immediately upon receipt of the pause frame.

The present invention will be more fully understood from the following detailed description of the embodiments thereof, taken together with the drawings in which:

DETAILED DESCRIPTION OF EMBODIMENTS

The standard PAUSE mechanism provided by Ethernet standards is useful in avoiding packet loss due to congestion, but it is essentially an on/off mechanism. It therefore suffers from a number of disadvantages, particularly in terms of port buffer utilization, since large buffers need to be allocated to handle worst-case scenarios. Embodiments of the present invention that are described hereinbelow make use of pause frames in an unconventional way, to implement a method of credit-based flow control that enhances the capability of network nodes to exercise precise control and make optimal use of available resources.

In terms of their format, PAUSE frames transmitted by network nodes in the disclosed embodiments remain compliant with the Ethernet standard. These nodes use the PAUSE frames, however, not to stop transmission, but rather to indicate flow control credit limits allocated by one node to another. In other words, while the structure of the PAUSE frames is essentially unchanged, their functionality is diametrically opposed to the conventional model: A node receiving such a "PAUSE" frame over a given link will not stop transmission, but can rather immediately transmit data frames over the link in response to the credit limit granted by the PAUSE frame. Transmission stops when the credits are exhausted.

In some embodiments, the PAUSE frame indicates respective credit limits for multiple priority groups on the communication link, thus supporting differentiated qualities of service for different flows on the same link. The node receiving such a PAUSE frame controls its transmission of data in each of the priority groups in accordance with the respective credit limits. This mechanism bears a certain resemblance to the credit-based flow control scheme that is mandated for InfiniBand™ switch fabrics by the *InfiniBand Architecture Specification Volume* 1 (Release 1.2.1, November, 2007), section 7.9, which is incorporated herein by reference.

Figure 1:
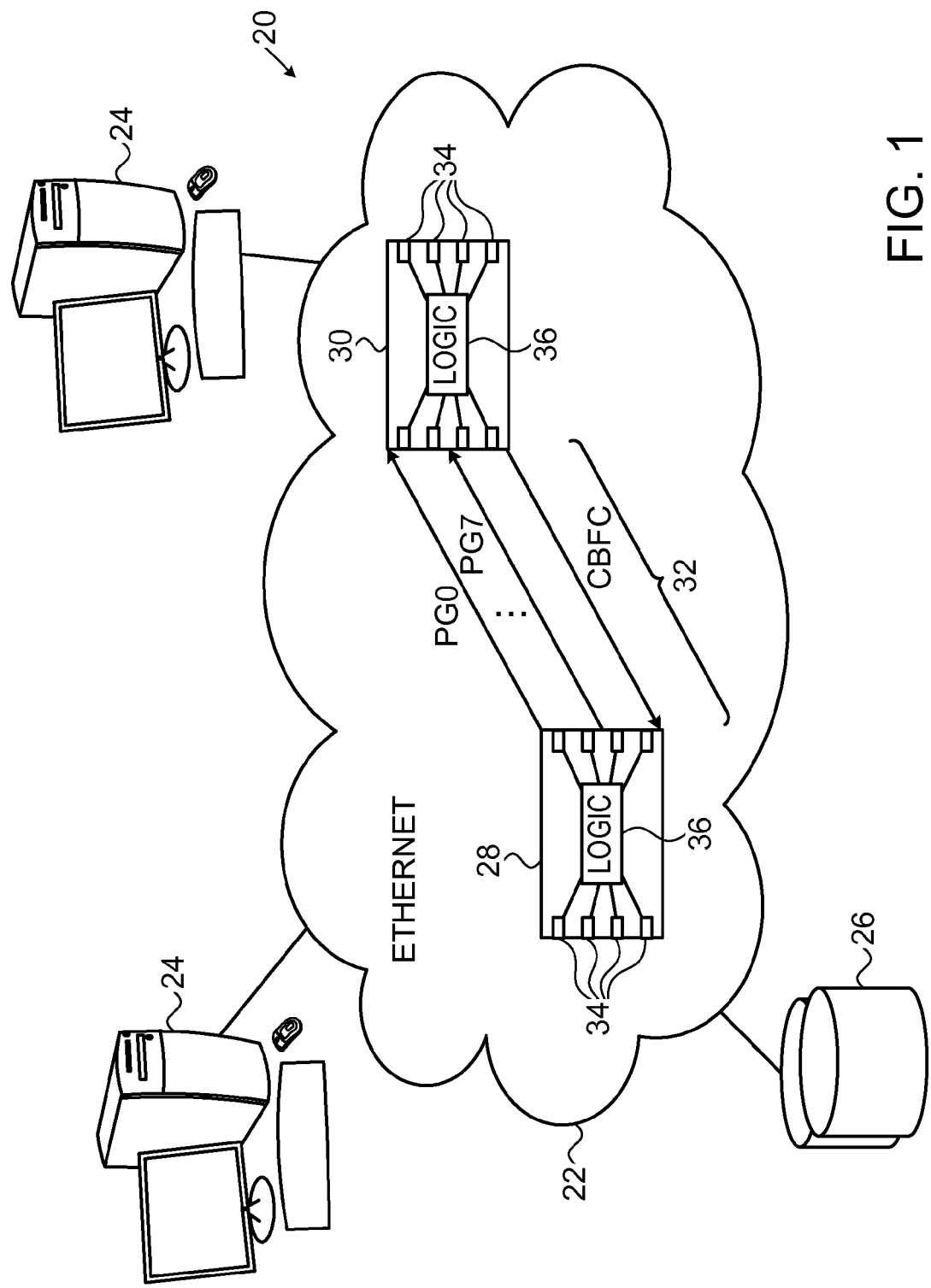
FIG. 1 is a block diagram that schematically illustrates a computer network system, in accordance with an embodiment of the present invention.

FIG. 1 is a block diagram that schematically illustrates a computer network system 20, in accordance with an embodiment of the present invention. The system is built around an Ethernet network 22, which connects computing nodes 24 and a storage node 26, for example. The network comprises multiple switches 28, 30, each comprising multiple ports 34 and switching and control logic 36, as is known in the art. In terms of hardware, the elements of system 20 comply with the Ethernet IEEE 802.3 standard, as outlined above, but they differ from standard Ethernet components in their handling of "PAUSE" frames. These differences may be implemented in software, firmware or hardware logic configuration, for example. The novel use of Ethernet PAUSE frames in credit-based flow control is described hereinbelow, for the sake of clarity, with reference to switches 28 and 30, but other sorts of network nodes, such as nodes 24 and 26, may use these PAUSE frames in the same manner.

Switches 28 and 30 are connected by a link 32, which extends between respective ports 34 of the two switches. The switches typically transmit data packets (commonly referred to in Ethernet networks as data frames) over link 32 in full-duplex mode. Optionally, the switches differentiate packet flows by levels of priority, identified in FIG. 1 as priority groups PG0, . . . , PG7, i.e., up to eight different priority levels in this example. (Alternatively, smaller or larger numbers of priority groups may be used.) Switch 28 regulates the volume of data transmitted in each priority group in accordance with credit-based flow control (CBFC) messages that it receives over link 32 from switch 30. Data transmission from switch 30 to switch 28 (not shown in the figure) is typically handled in like fashion.

The CBFC messages transmitted by switch 30 have the form of Ethernet PAUSE frames and comply with the format of MAC control frames that is dictated by the Ethernet standard. Conventional PAUSE frames contain a reserved field comprising forty-two bytes of padding (typically transmitted as all zeros), which is required to reach the minimum frame size dictated by the Ethernet standard. In system 20, however, these reserved bytes are used to carry flow-control information, as shown in the table below:

TABLE I

| PAUSE FRAME WITH FLOW CREDITS BYTES: | | | |
|---|---|---|---|
| 3 | 2 | 1 | 0 |
| DMAC (01-80-C2-00-00-01 or unicast) | | | |
| DMAC | | SMAC | |
| | SMAC | | |
| EtherType (88-08) | | Opcode (config) | |

TABLE I-continued

| PAUSE FRAME WITH FLOW CREDITS BYTES: | | | |
|---|---|---|---|
| 3 | 2 | 1 | 0 |
| — | FCTBS PG0 | — | FCCL PG0 |
| — | FCTBS PG1 | — | FCCL PG1 |
| | . . . | | |
| — | FCTBS PG7 | — | FCCL PG7 |
| | Padding | Padding | |
| Padding | | FCS | |

The fields of the above frame have the following meanings:

DMAC—destination MAC address. The multicast address 01-80-C2-00-00-01 is reserved by the IEEE 802.3 standard for MAC control PAUSE frames.

SMAC—source MAC address.

EtherType—The type code 88-08 indicates that this is a MAC control frame.

Opcode—The operation code is configurable, but may be set to 00-01 to indicate a "PAUSE" operation.

FCS—Frame check sequence.

FCTBS—Flow control total blocks sent by transmitting node (switch 28 in this example), used to synchronize cumulative data counts between the transmitter and receiver.

FCCL—Flow control credit limit, in blocks.

The FCTBS and FCCL values are provided separately for each priority group (PG0, PG1, . . . , PG7). They are computed and signaled as cumulative numbers of data blocks over time, in a manner similar to that provided in the InfiniBand flow control scheme mentioned above. (A block is a predefined volume of packet data, for example sixty-four bytes of data.) Alternatively, switch 30 may issue flow control credits incrementally, which switch 28 uses until they are consumed without maintaining a cumulative count.

Figure 2:
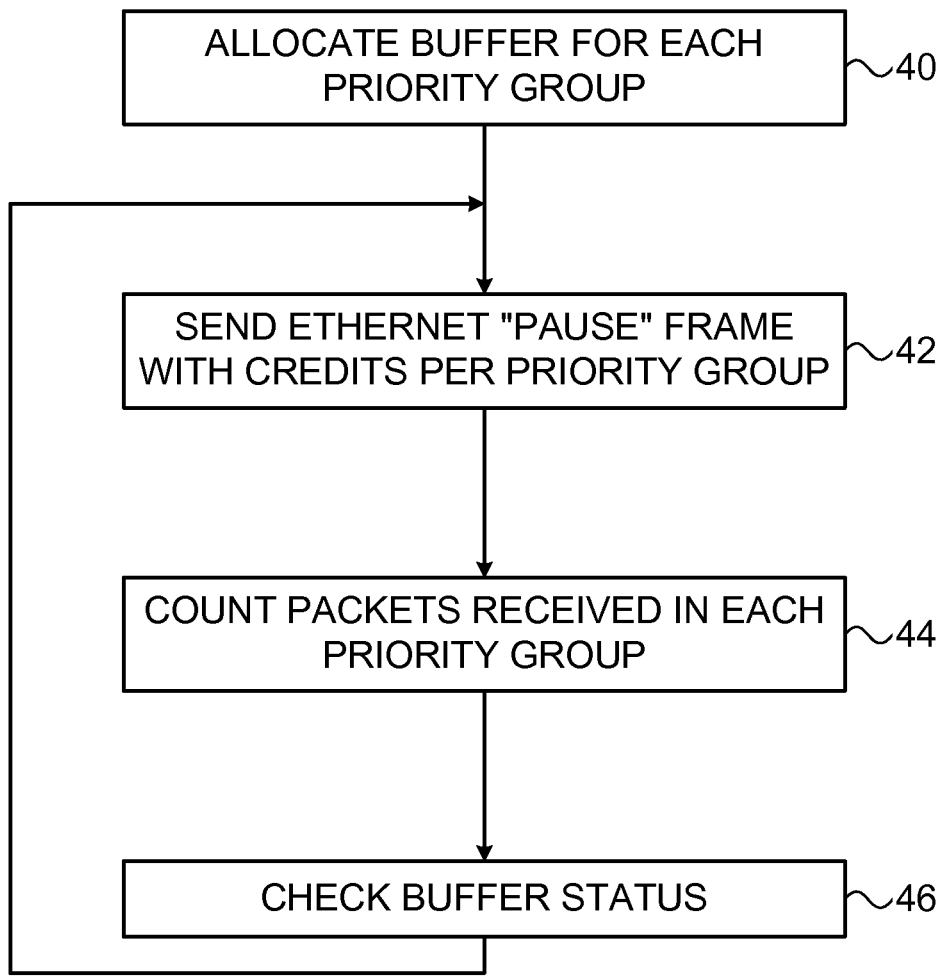
FIG. 2 is a flow chart that schematically illustrates a method for flow control, in accordance with an embodiment of the present invention.

FIG. 2 is a flow chart that schematically illustrates a method for flow control, in accordance with an embodiment of the present invention. As noted earlier, the method is described, for the sake of clarity and convenience, with reference to switches 28 and 30, as pictured in FIG. 1, with switch 28 serving as the data transmitter and switch 30 as the receiver. The method may similarly be applied, however, between any pair of network nodes that are configured to support the unconventional use of PAUSE frames that is described herein.

Logic 36 in switch 30 allocates buffers in the switch memory (not shown) for each priority group on link 32, at a buffer allocation step 40. Based on the available buffer sizes, logic 36 computes credit limits for allocation to each of the priority groups. Typically the credit limits are computed so as to allow maximal use of the available link bandwidth while avoiding buffer overflow at the receiver. Switch 30 then transmits a PAUSE frame via the appropriate port 34 over link 32, containing the respective credit limits for the priority groups, at a PAUSE transmission step 42. Logic 36 in switch 28 receives the PAUSE frame, updates its own credit records accordingly, and may then immediately transmit data frames in each priority group containing a volume of data that is in accordance with the respective credit limits.

Switches 28 and 30 count the numbers of data blocks transmitted and received in each priority group, at a counting step 44. This count may be used to update the FCTBS figures described above. Logic 36 in switch 30 periodically checks the status of its buffers, at a buffer checking step 46, to determine the amount of buffer space that is available for each priority group. Based on the available buffer space, logic 36 computes new credit limits and returns to step 42 to transmit a new PAUSE frame containing the updated credit limits. To the extent that switch 30 encounters congestion in forwarding the data frames that it has received from switch 28, buffers in switch 30 may fill. In this case, logic 36 will apply low credit limits to one or more of the priority groups, thus causing switch 28 to reduce the rate of data transmission for these priority groups. Alternatively, when the buffers are empty, logic 36 in switch 30 will set higher credit limits, thus encouraging switch 28 to continue full-rate transmission.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
sending an Ethernet pause frame from a first node to a second node over a communication link between the nodes, while indicating in the pause frame a flow control credit limit allocated by the first node to the second node by inserting a value in the pause frame corresponding to a number of data blocks to be transmitted from the second node to the first node; and
in response to the pause frame, transmitting one or more data frames from the second node to the first node containing a volume of data in accordance with the number of data blocks indicated in the pause frame upon receipt of the pause frame at the second node.

2. The method according to claim 1, wherein the pause frame comprises a field containing a value indicating that the pause frame is a medium access control (MAC) control frame in accordance with a network standard applicable to the communication link.

3. The method according to claim 2, wherein the field is selected from a group of fields consisting of:
a destination address field containing a multicast address reserved for pause frames;
a type field containing a control frame type code; and
an operation code field containing a pause opcode.

4. The method according to claim 1, wherein indicating the flow control credit limit comprises indicating in the pause frame respective credit limits for a plurality of priority groups on the communication link, and wherein transmitting the volume of data comprises controlling transmission of the data from the second node to the first node in each of the priority groups in accordance with the respective credit limits.

5. A communication system, comprising first and second network nodes connected by a communication link,
wherein the first network node is configured to send an Ethernet pause frame over the communication link to the second network node, while indicating in the pause frame a flow control credit limit allocated by the first node to the second node by inserting a value in the pause frame corresponding to a number of data blocks to be transmitted from the second node to the first node, and
wherein the second network node is configured to transmit, in response to the pause frame, one or more data frames containing a volume of data in accordance with the number of data blocks indicated in the pause frame over the communication link to the first network node upon receipt of the pause frame at the second network node.

6. The system according to claim 5, wherein the pause frame comprises a field containing a value indicating that the pause frame is a medium access control (MAC) control frame in accordance with a network standard applicable to the communication link.

7. The system according to claim 6, wherein the field is selected from a group of fields consisting of:
a destination address field containing a multicast address reserved for pause frames;
a type field containing a control frame type code; and
an operation code field containing a pause opcode.

8. The system according to claim 5, wherein the pause frame indicates respective credit limits for a plurality of priority groups on the communication link, and wherein the second node is configured to control transmission of the data to the first node in each of the priority groups in accordance with the respective credit limits.

9. Communication apparatus, comprising:
a communication port, which is configured to be coupled to a communication link for communication with a network node; and
logic, which is configured to send an Ethernet pause frame via the communication link to the network node, while indicating in the pause frame a flow control credit limit allocated by the first node to the second node by inserting a value in the pause frame corresponding to a number of data blocks to be transmitted from the second node to the first node, so as to cause the network node, in response to the pause frame, to transmit one or more data frames containing a volume of data in accordance with the number of data blocks indicated in the pause frame over the link to the communication port upon receipt of the pause frame at the network node.

10. The system according to claim 9, wherein the pause frame comprises a field containing a value indicating that the pause frame is a medium access control (MAC) control frame in accordance with a network standard applicable to the communication link.

11. The apparatus according to claim 9, wherein the pause frame indicates respective credit limits for a plurality of priority groups on the communication link, and wherein the pause frame causes the network node to control transmission of the data in each of the priority groups in accordance with the respective credit limits.

12. Communication apparatus, comprising:
a communication port, which is configured to be coupled to a communication link for communication with a network node; and
logic, which is configured to receive an Ethernet pause frame via the communication link from the network, while indicating in the pause frame a flow control credit limit allocated by the first node to the second node by inserting a value in the pause frame corresponding to a number of data blocks to be transmitted from the second node to the first node, and in response to the pause frame, to transmit one or more data frames containing a volume of data in accordance with the number of data blocks indicated in the pause frame over the link via the communication port upon receipt of the pause frame.

13. The apparatus according to claim 12, wherein the pause frame comprises a field containing a value indicating that the pause frame is a medium access control (MAC) control frame in accordance with a network standard applicable to the communication link.

14. The apparatus according to claim 12, wherein the pause frame indicates respective credit limits for a plurality of priority groups on the communication link and causes the logic to control transmission of the data in each of the priority groups in accordance with the respective credit limits.

* * * * *